United States Patent
Okauchi et al.

(10) Patent No.: US 9,073,151 B2
(45) Date of Patent: Jul. 7, 2015

(54) DISSIMILAR MATERIAL JOINT, STRUCTURE IN WHICH DISSIMILAR MATERIAL JOINT IS USED, AND METHOD OF PRODUCING THE SAME

(75) Inventors: Hironori Okauchi, Nishinomiya (JP); Yukichi Takaoka, Kobe (JP); Takumi Yoshida, Kobe (JP); Noriko Ohmichi, Himeji (JP); Mitsuo Fujimoto, Kobe (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 0 days.

(21) Appl. No.: 14/126,618

(22) PCT Filed: Jun. 22, 2012

(86) PCT No.: PCT/JP2012/004054
§ 371 (c)(1),
(2), (4) Date: Dec. 16, 2013

(87) PCT Pub. No.: WO2012/176466
PCT Pub. Date: Dec. 27, 2012

(65) Prior Publication Data
US 2014/0112709 A1    Apr. 24, 2014

(30) Foreign Application Priority Data
Jun. 22, 2011  (JP) .................. 2011-138746

(51) Int. Cl.
*B23K 31/02* (2006.01)
*B23K 20/08* (2006.01)
(Continued)

(52) U.S. Cl.
CPC ............. *B23K 31/02* (2013.01); *Y10T 403/478* (2015.01); *B23K 20/08* (2013.01); *B63B 25/16* (2013.01);
(Continued)

(58) Field of Classification Search
CPC ...... B65D 88/04; B65D 88/12; B65D 88/129; B65D 90/12; B65D 90/14; B63B 25/08; B63B 2025/087; B63B 3/14; B23K 2203/18; B23K 2203/20; B23K 31/02; B23K 31/12; B23K 20/08; B23K 20/2275; B23K 33/00; B23K 9/23; B32B 15/01; B32B 15/012; B32B 3/02; F17C 13/082; F17C 13/08; F17C 2205/0192; F17C 2201/0128; F17C 2221/033; F17C 2270/0105; F17C 2223/033; F17C 2223/0161
USPC ........................ 220/647, 560.11, 560.09, 646; 114/74 R; 228/107, 174, 178, 184, 2.5
See application file for complete search history.

(56) References Cited

U.S. PATENT DOCUMENTS
3,443,306 A * 5/1969 Meyer ........................... 228/165
(Continued)

FOREIGN PATENT DOCUMENTS
DE        3813860 A1 * 11/1989
(Continued)

OTHER PUBLICATIONS
Translation for DE 3813860 A1.*
(Continued)

*Primary Examiner* — Fenn Mathew
*Assistant Examiner* — Robert Stodola
(74) *Attorney, Agent, or Firm* — Oliff PLC

(57) ABSTRACT

A dissimilar material joint is formed by arranging a plurality of joint segments consecutively in a longitudinal direction. Each joint segment is formed by joining and integrating together a first member, an intermediate member, and a second member by explosive welding. A groove is formed in a joint end face of each joint segment, the joint end face being joined to another one of the segments, the groove spacing apart an end face of the first member and an end face of the second member from each other in a stacking direction. In the dissimilar material joint, the end faces of the respective first members of the joint segments that are adjacent to each other are joined together by welding, and the end faces of the respective second members of the joint segments that are adjacent to each other are joined together by welding.

14 Claims, 10 Drawing Sheets

(51) Int. Cl.
*B23K 20/227* (2006.01)
*B32B 15/01* (2006.01)
*B32B 3/02* (2006.01)
*B63B 3/14* (2006.01)
*B63B 9/06* (2006.01)
*B65D 90/08* (2006.01)
*B65D 90/14* (2006.01)
*B63B 25/16* (2006.01)
*B63B 25/08* (2006.01)

(52) U.S. Cl.
CPC ............ *B23K 20/2275* (2013.01); *B32B 15/01* (2013.01); *B32B 15/012* (2013.01); *B32B 3/02* (2013.01); *B63B 3/14* (2013.01); *B63B 9/06* (2013.01); *B23K 2203/18* (2013.01); *F17C 2205/0192* (2013.01); *F17C 2201/0128* (2013.01); *F17C 2201/052* (2013.01); *F17C 2221/033* (2013.01); *F17C 2223/0161* (2013.01); *F17C 2223/033* (2013.01); *F17C 2270/0105* (2013.01); *B65D 90/08* (2013.01); *B65D 90/14* (2013.01); *B63B 2025/087* (2013.01)

(56) References Cited

U.S. PATENT DOCUMENTS

| | | | | | |
|---|---|---|---|---|---|
| 3,841,269 | A | * | 10/1974 | Urruela | 114/74 R |
| RE29,424 | E | * | 10/1977 | Bognaes et al. | 62/53.2 |
| RE29,463 | E | * | 11/1977 | Bognaes et al. | 62/53.2 |
| 4,382,524 | A | * | 5/1983 | Kvamsdal | 220/560.09 |
| 2003/0201037 | A1 | * | 10/2003 | Totino et al. | 148/528 |

FOREIGN PATENT DOCUMENTS

| | | |
|---|---|---|
| JP | A-60-30587 | 2/1985 |
| JP | A-2006-71034 | 3/2006 |
| JP | A-2007-153064 | 6/2007 |

OTHER PUBLICATIONS

Sep. 25, 2012 International Search Report issued in International Application No. PCT/JP2012/004054.

* cited by examiner

DISSIMILAR MATERIAL JOINT, STRUCTURE IN WHICH DISSIMILAR MATERIAL JOINT IS USED, AND METHOD OF PRODUCING THE SAME

TECHNICAL FIELD

The present invention relates to: a dissimilar material joint for use in joining dissimilar materials formed of different materials from each other together by welding; a structure produced by using the dissimilar material joint; and a method of producing the structure.

BACKGROUND ART

Conventionally, the hull of a liquid carrying ship such as an LNG (Liquefied Natural Gas) carrier is equipped with at least one liquid storage tank. In the case of an LNG carrier, as shown in FIG. 13, a spherical tank 3 formed of an aluminum alloy for use in storing LNG in an extremely low temperature (−163° C.) is fixed to a hull 2 which is formed of for example, a steel or stainless steel. The spherical tank 3 is fixed to the hull 2 via a cylindrical support structure called a tank skirt 4.

The upper part of the tank skirt 4 is joined to the tank 3 by welding, and the lower part of the tank skirt 4 is joined to the hull 2 by welding. Therefore, the tank skirt 4 includes: an upper structural member 41 formed of the same material as that of the tank 3 (here, an aluminum alloy); a lower structural member 42 formed of the same material as that of the hull 2 (here, a steel); and an intermediate structural member 43 disposed between the upper structural member 41 and the lower structural member 42. The intermediate structural member 43 is formed of a material having low thermal conductivity, for example, a stainless steel. A steel and a stainless steel can be joined together by welding. However, since the melting point of a stainless steel is significantly different from the melting point of an aluminum alloy, it is difficult to directly join these dissimilar materials together by welding. In addition, it is known that if these materials are mixed together in a melted state, the material strength is reduced significantly. Therefore, the upper structural member 41 and the intermediate structural member 43 are joined together via a dissimilar material joint 50. The upper end of the dissimilar material joint 50 is joined to the upper structural member 41 by welding, and the lower end of the dissimilar material joint 50 is joined to the intermediate structural member 43 by welding. Patent Literature 1 discloses one example of the dissimilar material joint 50.

According to Patent Literature 1, as shown in FIG. 14, the dissimilar material joint 50 includes: a first member 51 formed of the same material as that of the intermediate structural member 43 (here, a stainless steel); a nickel member 52; a titanium member 53; and a second member 54 formed of the same material as that of the upper structural member 41 (here, an aluminum alloy). The first member 51, the nickel member 52, the titanium member 53, and the second member 54 are stacked and fixed to each other, and thus integrated together. The dissimilar material joint 50 is fabricated in the following method: first, the nickel member 52 is placed on the first member 51, and the first member 51 and the nickel member 52 are joined together by explosive welding; next, the titanium member 53 is placed on the nickel member 52, and in such a state, the nickel member 52 and the titanium member 53 are joined together by explosive welding; and at last, the second member 54 is placed on the titanium member 53, and in such a state, the titanium member 53 and the second member 54 are joined together by explosive welding. It should be noted that explosive welding is alternatively referred to as "explosive bonding", which is a method of joining two kinds of metals together by causing the metals to collide with each other at high speed with explosive force.

The dissimilar material joint 50 fabricated by the above-described method is placed on the intermediate structural member 43 of the tank skirt 4 in a process of producing the tank skirt 4, and the lower end of the dissimilar material joint 50 and the upper end of the intermediate structural member 43 are fillet-welded. Further, the upper structural member 41 is placed on the dissimilar material joint 50, and the upper end of the dissimilar material joint 50 and the lower end of the upper structural member 41 are fillet-welded. In this manner, the upper structural member 41 and the intermediate structural member 43, which form the tank skirt 4, are integrated together via the dissimilar material joint 50.

CITATION LIST

Patent Literature

PTL 1: Japanese Laid-Open Patent Application Publication No. 2006-71034

SUMMARY OF INVENTION

Technical Problem

Among the structural members forming the tank skirt, those fillet-welded to the dissimilar material joint are provided with slots (scallops) for the purpose of preventing welding lines from crossing each other. For example, as shown in FIG. 14, a slot 46 of the upper structural member 41 and a slot 47 of the intermediate structural member 43 are arranged in a manner to vertically face each other at a position between adjoining dissimilar material joints 50. In the case of fillet-welding the upper structural member 41 and the dissimilar material joint 50 and fillet-welding the dissimilar material joint 50 and the intermediate structural member 43, thickness portions of the upper structural member 41 and the intermediate structural member 43, the thickness portions being exposed at edges of the slots 46 and 47 (i.e., at portions indicated by the reference sign W in FIG. 14), need to be box-welded. Since the slots 46 and 47 are narrow, the boxing at the edges of the slots 46 and 47 is technically very demanding for a welder.

Currently, the length of the dissimilar material joint fabricated in the above-described method is 2 to 3 m at a maximum due to the nature of an apparatus used for the explosive bonding. Accordingly, a large number of dissimilar material joints are arranged in an annular manner between the upper structural member and the intermediate structural member of the tank skirt, and the upper structural member and the intermediate structural member are provided with a large number of slots corresponding to the number of dissimilar material joints. Consequently, in the production of the tank skirt, the number of box-welded portions for joining the slots and the dissimilar material joints is large, which makes the welding work cumbersome and complicated, and also, the amount of machining for forming the slots is large.

In order to solve the above-described problems, the length of the dissimilar material joint may be extended. However, if it is attempted to join conventional dissimilar material joints together by welding for the purpose of extending the length of the dissimilar material joint, there is a risk that different kinds of components of the dissimilar material joint become mixed together in a melted state. For example, if an aluminum alloy and a stainless steel are mixed together in a melted state, their mechanical strength is reduced significantly. Moreover, in the case of attempting to join conventional dissimilar material joints together by welding, the amount of thermal deformation caused by the welding heat input varies among different kinds of components of the dissimilar material joint, and therefore, there is a risk that detachment (crack) occurs at a joint interface between the components, causing reduction in the mechanical strength of the dissimilar material joint. For example, in a case where the different kinds of components forming the dissimilar material joint are an aluminum alloy and a stainless steel, the thermal deformation of the aluminum alloy caused by the welding heat input is greater than the thermal deformation of the stainless steel caused by the welding heat input, and there is a risk of occurrence of detachment (crack) at the joint interface between the aluminum alloy and the stainless steel.

The present invention has been made to solve the above-described problems. An object of the present invention is to provide a dissimilar material joint that can be made more elongated compared to conventional art, a structure in which the dissimilar material joint is used, and a method of producing the structure.

Solution to Problem

A dissimilar material joint according to the present invention includes a plurality of segments arranged consecutively in a longitudinal direction. Each segment includes: a first member; an intermediate member formed of a material different from a material of the first member, the intermediate member being joined to the first member in a stacking direction by explosive welding; a second member formed of a material different from the material of the first member and different from the material of the intermediate member, the second member being joined to the intermediate member in the stacking direction by explosive welding; and a recess formed in a joint end face joined to another one of the segments, the recess spacing apart an end face of the first member and an end face of the second member from each other in the stacking direction along the joint end face. The end faces of the respective first members of the segments that are adjacent to each other are joined together by welding. The end faces of the respective second members of the segments that are adjacent to each other are joined together by welding.

The dissimilar material joint having the above-described configuration is formed by joining the plurality of segments together in the longitudinal direction. Therefore, regardless of a restriction on the length of a dissimilar material joint in the longitudinal direction due to an apparatus used for the explosive welding, the length can be made longer beyond the restriction. That is, the dissimilar material joint according to the present invention can be made more elongated compared to conventional dissimilar material joints. At the time of welding the segments together, the same kinds of components of the segments are joined together by welding, and since different kinds of components of the segments are spaced apart from each other by the recess, there is not a risk of the different kinds of components of the segments being mixed together in a melted state. Accordingly, in the dissimilar material joint, there is no portion where dissimilar materials are mixed together in a melted state, and thus the mechanical strength of the dissimilar material joint is not impaired.

In the above dissimilar material joint, desirably, the recess is formed such that an end face of the intermediate member is recessed in the longitudinal direction from the joint end face. Further desirably, an amount by which the end face of the intermediate member is recessed from the joint end face is such an amount as to allow a temperature of a joint interface between the first member and the intermediate member and a temperature of a joint interface between the intermediate member and the second member to become a predetermined temperature or lower, the predetermined temperature causing a risk of occurrence of detachment at the joint interfaces, when welding heat input of the welding of the end faces of the first members and welding heat input of the welding of the end faces of the second members are applied to the joint interfaces.

According to the above configuration, ends of joint interfaces between components of each segment are away from welding end faces of the segments to be welded together. This makes it possible to reduce an influence of welding heat input on the joint interfaces between the components of each segment when the segments are welded together.

In the above dissimilar material joint, desirably, each segment includes hollow space formed at a position that is set back from the joint interface further than the recess in the longitudinal direction, the hollow space spacing apart the first member and the second member from each other in the stacking direction.

According to the above configuration, when the segments are welded together, even if detachment has occurred at a joint interface between components of a segment due to welding heat input, the propagation of the detachment is stopped at the hollow space. This makes it possible to prevent the detachment from propagating further toward the inside beyond the hollow space (toward the inside of the segment in the longitudinal direction).

In the above dissimilar material joint, desirably, the recesses of the respective segments that are adjacent to each other are arranged continuously to form space, and a backing member having such a shape as to be in contact with the first and second members of both of the segments that are adjacent to each other is provided in the space.

According to the above configuration, the backing member fills a part of the space formed between the segments that are adjacent to each other, thereby improving the mechanical strength of the dissimilar material joint against compression.

In the above dissimilar material joint, desirably, the backing member is formed of a material whose thermal conductivity is higher than a thermal conductivity of the first member and a thermal conductivity of the second member, and the backing member has such a shape as not to come into contact with the intermediate members of both of the segments that are adjacent to each other.

According to the above configuration, at the time of welding the segments together, a large amount of heat out of the welding heat input is transferred to the backing member, and thereby the amount heat transferred to the components of the segments is reduced, which makes it possible to prevent detachment at a joint interface between segment components.

In the above dissimilar material joint, desirably, the recess has a first face formed by the first member, a second face formed by the second member, and a third face formed by the first member, the intermediate member, and the second member. Desirably, a corner at an edge line where the first face and the third face are connected, and a corner at an edge line where the second face and the third face are connected, are rounded, and the third face is a flat face substantially parallel to the joint end face.

According to the above configuration, the first member, an end face of the intermediate member, and the second member are exposed at the third face in a manner to form a substantially planar face. This further reduces a possibility of occurrence of detachment at a joint interface between segment components.

A structure according to the present invention includes: the above dissimilar material joint; a first structural member joined to the first member of the dissimilar material joint by welding; and a second structural member joined to the second member of the dissimilar material joint by welding.

According to the structure having the above-described configuration, by using the dissimilar material joint which is more elongated compared to conventional art, the number of dissimilar material joints used per predetermined length of each structural member can be reduced. Generally speaking, base materials (structural members) between dissimilar material joints are provided with slots for the purpose of preventing welding lines from crossing each other. By reducing the number of dissimilar material joints, the number of slots provided per predetermined length of each structural member can be reduced. This consequently makes it possible to reduce the amount of machining for forming the slots and to reduce the number of portions where the dissimilar material joints and the structural members are box-welded.

In the above structure, both of the first member and the first structural member may be formed of an aluminum alloy, and both of the second member and the second structural member may be formed of a stainless steel. The structure may be a tank skirt of a spherical tank of an LNG carrier.

A method of producing a structure according to the present invention includes: fabricating a plurality of segments; fabricating a dissimilar material joint by consecutively arranging the plurality of segments in a longitudinal direction; joining one side of the dissimilar material joint and a first structural member together by welding; and joining another side of the dissimilar material joint and a second structural member together by welding. In the method, fabricating the plurality of segments includes: joining a first member and an intermediate member together in a stacking direction by explosive welding, the first member being formed of a same material as a material of the first structural member; joining the intermediate member and a second member together in the stacking direction by explosive welding, the second member being formed of a same material as a material of the second structural member; and forming a recess in a joint end face of each segment, the joint end face being joined to another one of the segments, the recess spacing apart an end face of the first member and an end face of the second member from each other in the stacking direction along the joint end face. In the method, fabricating the dissimilar material joint includes: joining together the end faces of the respective first members of the segments that are adjacent to each other by welding; and joining together the end faces of the respective second members of the segments that are adjacent to each other by welding.

According to the above method of producing a structure, the dissimilar material joint is formed by joining the plurality of segments together in the longitudinal direction. Therefore, regardless of a restriction on the length of a dissimilar material joint in the longitudinal direction due to an apparatus used for the explosive welding, the length can be made longer beyond the restriction. That is, the dissimilar material joint can be made more elongated compared to conventional dissimilar material joints. Although the dissimilar material joint is formed by welding the plurality of segments together, there is no portion where dissimilar materials are mixed together in a melted state because of an advantageous effect provided by the recess, and thus the mechanical strength of the dissimilar material joint is not impaired. By using such an elongated dissimilar material joint to connect the first structural member and the second structural member, the number of dissimilar material joints used per predetermined length of each structural member can be reduced compared to conventional art. Generally speaking, base materials (structural members) between dissimilar material joints are provided with slots for the purpose of preventing welding lines from crossing each other. By reducing the number of dissimilar material joints, the number of slots provided per predetermined length of each structural member can be reduced. This consequently makes it possible to reduce the amount of machining for forming the slots and to reduce the number of portions where the dissimilar material joints and the structural members are box-welded.

Advantageous Effects of Invention

According to the present invention, the dissimilar material joint is formed by joining the plurality of segments together in the longitudinal direction. Therefore, regardless of a restriction on the length of a dissimilar material joint in the longitudinal direction due to an apparatus used for the explosive welding, the length can be made longer beyond the restriction. That is, the dissimilar material joint can be made more elongated compared to conventional dissimilar material joints. By using such an elongated dissimilar material joint to connect the first structural member and the second structural member, the number of dissimilar material joints used per predetermined length of each structural member can be reduced compared to conventional art.

DESCRIPTION OF EMBODIMENTS

Figure 1:
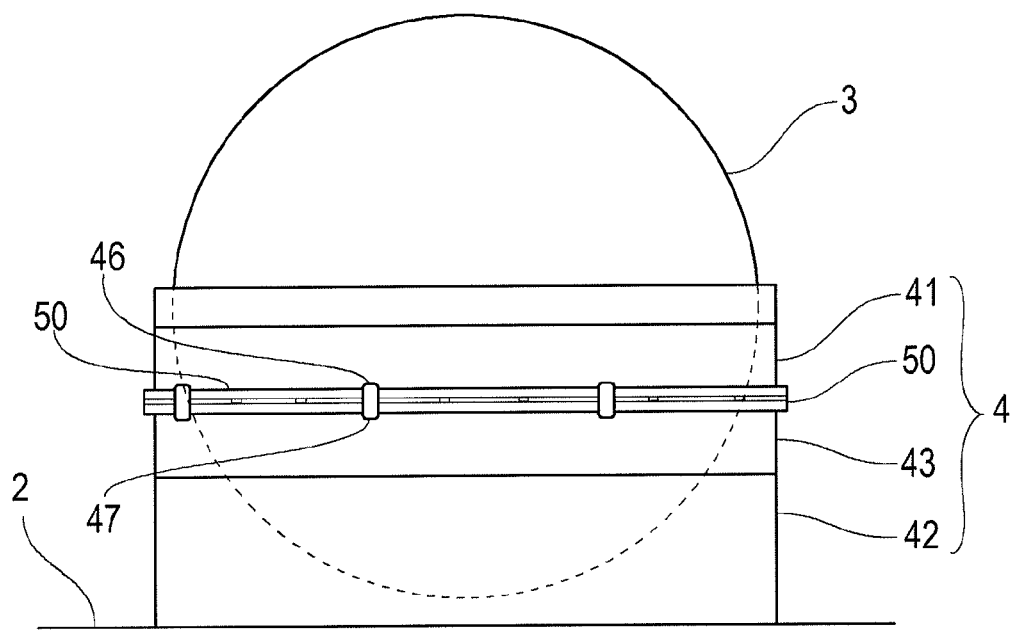
FIG. 1 is a schematic side view showing a support structure for a tank of an LNG carrier according to one embodiment of the present invention.

Hereinafter, one embodiment of the present invention is described in detail with reference to the drawings. In the drawings, the same or corresponding elements are denoted by the same reference signs, and a repetition of the same description is avoided. The description below describes, as one embodiment of a tank skirt according to the present invention, an example in which the tank skirt is applied to an LNG carrier.

FIG. 1 is a schematic side view showing a support structure for a tank of an LNG carrier according to one embodiment of the present invention. As shown in FIG. 1, the LNG carrier is a ship equipped with a plurality of spherical tanks 3 for use in storing natural gas. Each spherical tank 3 is configured to store therein natural gas liquefied at a low temperature. In general, the spherical tank 3 is formed of an aluminum alloy. The spherical tank 3 is fixed to a hull 2 via a tank skirt 4.

The tank skirt 4 is a cylindrical support structure having a hollow center. Main components of the tank skirt 4 are: an upper structural member 41 serving as a tank-side structural member; a lower structural member 42 serving as a hull-side structural member; and an intermediate structural member 43 disposed between the upper structural member 41 and the lower structural member 42. Each of the upper structural member 41, the lower structural member 42, and the intermediate structural member 43 has a cylindrical shape with a hollow center.

The upper structural member 41 is formed of the same material as that of the spherical tank 3. In the present embodiment, the upper structural member 41 is formed of an aluminum alloy. The upper end of the upper structural member 41 is fixed to the equator, or the vicinity of the equator, of the spherical tank 3 by welding. A plurality of slots 46 are formed such that they are circumferentially arranged with predetermined intervals at the lower edge of the upper structural member 41.

The lower structural member 42 is formed of the same material as that of the hull 2. In the present embodiment, the lower structural member 42 is formed of a steel. The lower end of the lower structural member 42 is fixed to a base (not shown) provided on the hull 2 by welding, bolt fastening, or the like.

The intermediate structural member 43 serves as an insulator (thermal brake) between the upper structural member 41 and the lower structural member 42. The temperatures of the upper structural member 41 and the lower structural member 42 become extremely low due to thermal conduction from the natural gas stored in the spherical tank 3. Accordingly, the intermediate structural member 43 is formed of γ stainless steel having low thermal conductivity. The lower end of the intermediate structural member 43 is fixed to the upper end of the lower structural member 42 by welding or the like. A plurality of slots 47 are formed such that they are circumferentially arranged with predetermined intervals at the upper edge of the intermediate structural member 43. The upper end of the intermediate structural member 43 is connected to the lower end of the upper structural member 41 via a plurality of dissimilar material joints 50. The slots 46 of the upper structural member 41 and the slots 47 of the intermediate structural member 43 are arranged in a manner to vertically face each other.

Figure 2:
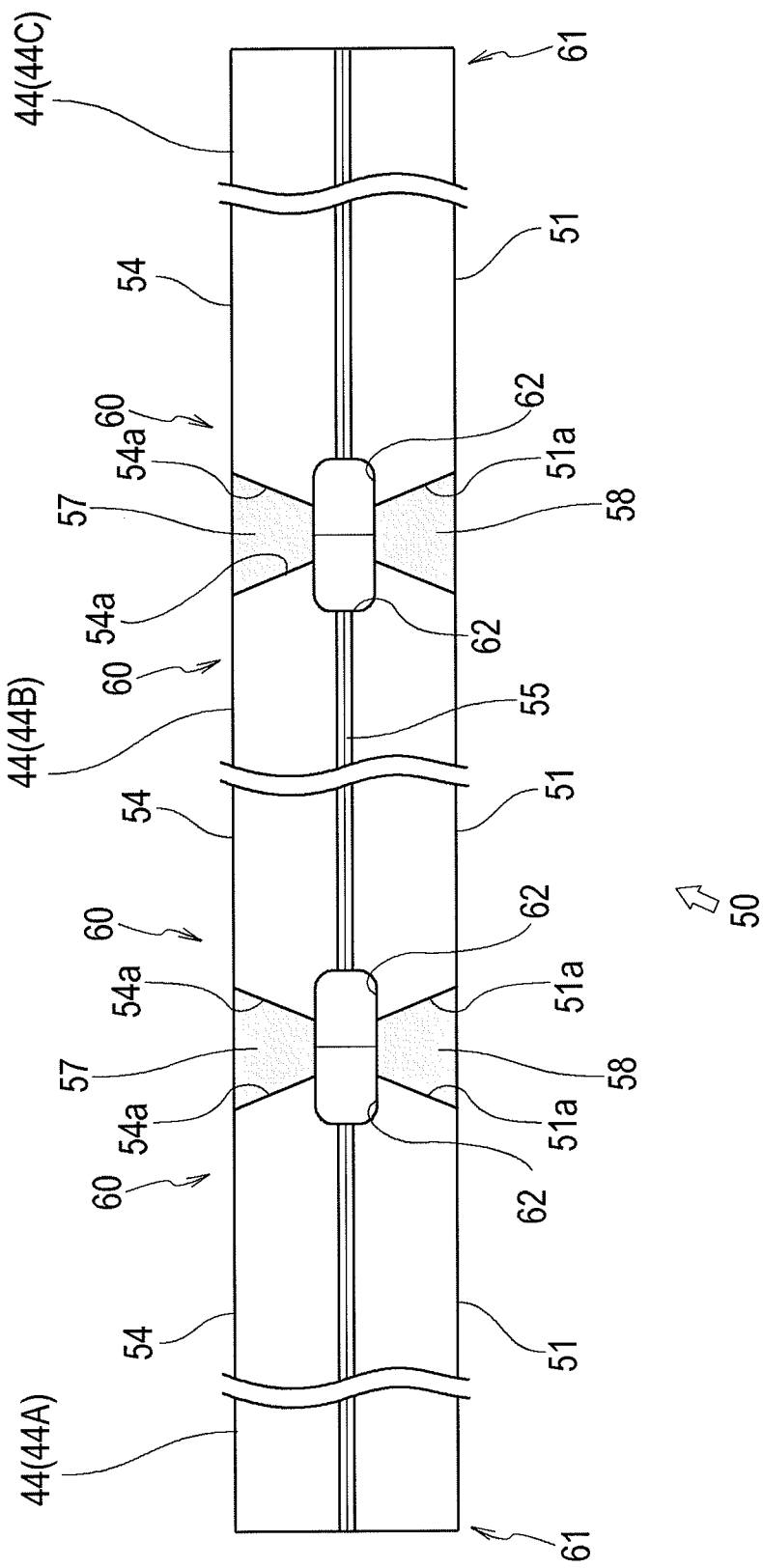
FIG. 2 is a side view of a dissimilar material joint according to the embodiment of the present invention.

Hereinafter, a dissimilar material joint 50 is described in detail. FIG. 2 is a side view of a dissimilar material joint according to the embodiment of the present invention. As shown in FIG. 2, the dissimilar material joint 50 is formed of a plurality of segments (hereinafter, referred to as "joint segments 44"). The plurality of joint segments 44 of the dissimilar material joint 50 are arranged consecutively in the longitudinal direction of the dissimilar material joint 50. First, the joint segments 44 are described in detail.

Figure 3:
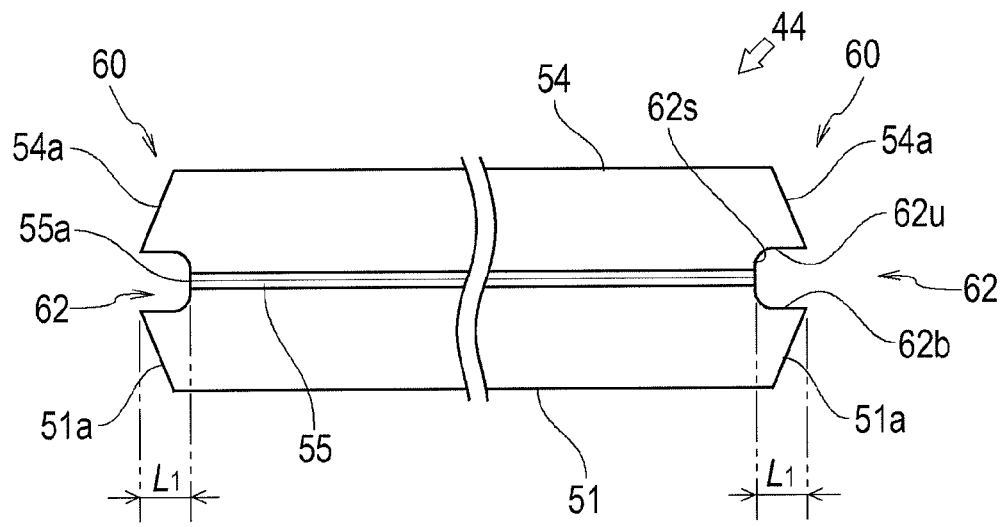
FIG. 3 is a side view of a joint segment, both ends of which in the longitudinal direction are joint ends.
Figure 4:
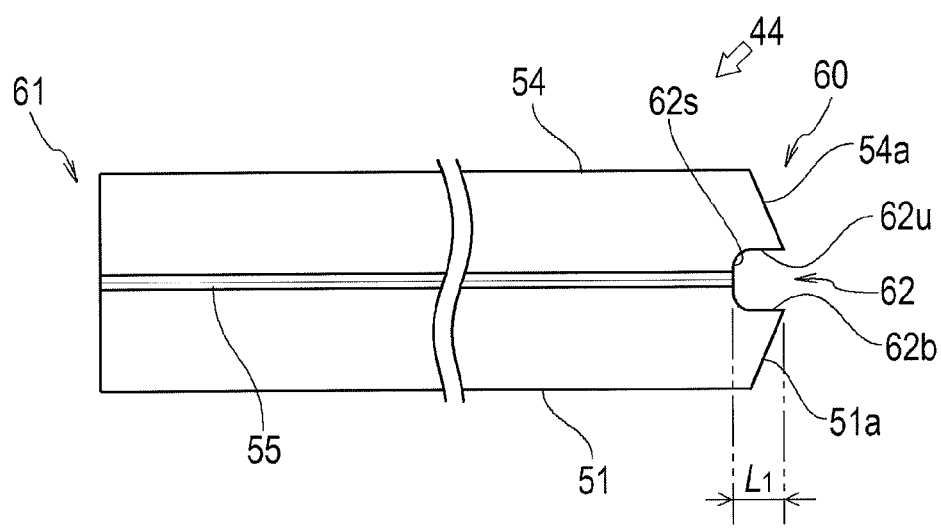
FIG. 4 is a side view of a joint segment, one end of which in the longitudinal direction is a joint end.

FIG. 3 is a side view of a joint segment 44, both ends of which in the longitudinal direction are joint ends 60. FIG. 4 is a side view of a joint segment 44, one end of which in the longitudinal direction is a joint end 60. As shown in FIGS. 2 to 4, each joint segment 44 has a joint end 60 at its one or both ends in the longitudinal direction. Thus, the joint segments 44 are categorized into: a joint segment 44, both ends of which in the longitudinal direction are joint ends 60 to be joined to other joint segments 44 (FIG. 3); and a joint segment 44, one end of which in the longitudinal direction is a joint end 60 to be joined to another joint segment 44 and the other end of which in the longitudinal direction is a non-joint end 61 (see FIG. 4). For each joint segment 44, whether each end thereof in the longitudinal direction is a joint end 60 or a non-joint end 61 is determined based on the placement of the joint segment 44 in the dissimilar material joint 50. That is, among the ends of the joint segments 44 in the longitudinal direction, those positioned at the ends of the dissimilar material joint 50 in the longitudinal direction are non-joint ends 61, and those to be joined to other joint segments 44 are joint ends 60. The longitudinal direction of the dissimilar material joint 50 is the same as the longitudinal direction of the joint segments 44. Hereinafter, among the end faces of the joint segments 44 in the longitudinal direction, those serving as the end faces of the joint ends 60 are each referred to as a "joint end face".

Each joint segment 44 includes: a first member 51 formed of the same material as that of the intermediate structural member 43; a second member 54 formed of the same material as that of the upper structural member 41; and an intermediate member 55 interposed between the first member 51 and the second member 54. Each of the first member 51, the intermediate member 55, and the second member 54 is a plate-shaped member elongated in one direction (longitudinal direction). The first member 51, the intermediate member 55, and the second member 54 are fixed to each other in a state where these members are stacked together in said order in one direction (stacking direction). To be more specific, the upper surface of the first member 51 and the lower surface of the intermediate member 55 are joined together, and the upper surface of the intermediate member 55 and the lower surface of the second member 54 are joined together.

In the present embodiment, the first member 51 is formed of γ stainless steel, and the second member 54 is formed of an aluminum alloy. The intermediate member 55 is formed by fixing more than one metal plate to each other in a state where these metal plates are stacked together. Generally speaking, it is known that, for example, a stack of nickel and titanium is used as an intermediate member to be inserted between the stainless steel and the aluminum alloy. However, the intermediate member 55 is not limited to this example.

At the joint ends 60 of the joint segments 44, lower surface grooves 51a are formed in the lower surfaces of the first members 51. The lower surface grooves 51a form a V-groove, and the depth of the groove is less than the thickness of the first member 51. Also at the joint ends 60 of the joint segments 44, upper surface grooves 54a are formed in the upper surfaces of the second members 54. The upper surface grooves 54a form a V-groove, and the depth of the groove is less than the thickness of the second member 54. Moreover, a groove 62, which is open toward the outside (outwardly in the longitudinal direction), is formed in the joint end face of each joint segment 44. At the joint end 60 of each joint segment 44, the groove 62 spaces apart the end face of the first member 51 and the end face of the second member 54 from each other in the stacking direction along the joint end face.

The groove 62 is a recess having a substantially C-shaped (or substantially inverted C-shaped) cross section, and extends along the joint end face of the joint segment 44. An upper face 62u of the groove 62 is formed by the second member 54; a lower face 62b of the groove 62 is formed by the first member 51; a side face 62s of the groove 62 is formed by the first member 51, the intermediate member 55, and the second member 54; and an end face 55a of the intermediate member 55 is exposed at the side face 62s, the end face 55a being a flat face substantially parallel to the joint end face of the joint segment 44. Accordingly, the edge line between the upper face 62u and the side face 62s of the groove 62, and the edge line between the lower face 62b and the side face 62s of the groove 62, each have a rounded shape. At the side face 62s, the first member 51, the end face 55a of the intermediate member 55, and the second member 54 are smoothly continuous in a planar fashion. Since the end face 55a of the intermediate member 55 is a flat face substantially parallel to the joint end face of the joint segment 44, detachment (crack) does not easily occur at joint interfaces between the components (first member 51, intermediate member 55, second member 54) of the joint segment 44.

Owing to the groove 62 formed in the joint end face of the joint segment 44, the end face 55a of the intermediate member 55 is recessed to the inside (inwardly in the longitudinal direction) from the joint end face of the joint segment 44. In other words, an end of the joint interface between the first member 51 and the intermediate member 55, and an end of the joint interface between the intermediate member 55 and the second member 54, are recessed to the inside from the joint end face of the joint segment 44. The amount of recess of the end face 55a of the intermediate member 55 from the joint end face of the joint segment 44 (here, corresponding to a distance from the opening of the groove 62 to the side face 62s) is assumed as L1.

Figure 5:
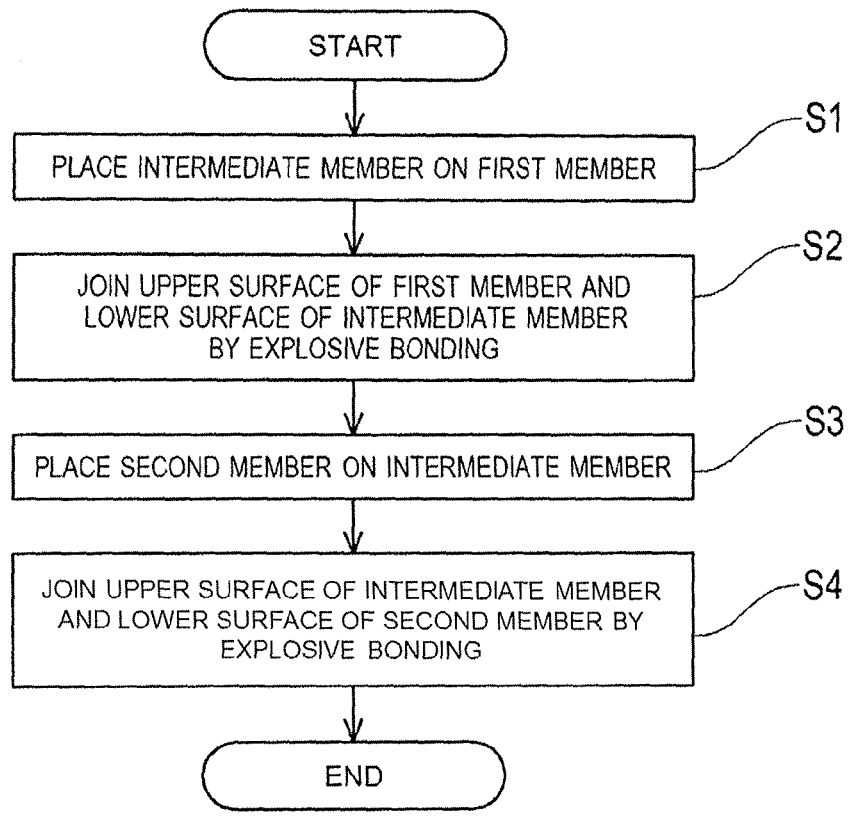
FIG. 5 is a flowchart showing a flow of fabrication of a joint segment.

The joint segment 44 having the above-described structure is fabricated in a manner described below. FIG. 5 is a flowchart of a joint segment fabrication process. As shown in FIG. 5, first, the intermediate member 55 is placed on the first member 51 (step S1). In this state, the first member 51 and the intermediate member 55 are joined together by explosive welding (explosive bonding) (step S2). Specifically, in a state where the first member 51 and the intermediate member 55 are stacked together, gunpowder is exploded to cause the intermediate member 55 to collide with the first member 51. With the colliding force, a new interface is exposed and at the same time pressure is applied, so that the intermediate member 55 and the first member 51 are joined together. It should be noted that in a case where the intermediate member 55 is formed of a plurality of components, the first member 51 and a component of the intermediate member 55, the component being positioned at the bottom of the intermediate member 55, are joined together by explosive welding, and then the other components of the intermediate member 55 are sequentially joined by welding or explosive welding. Next, the second member 54 is placed on the intermediate member 55 (step S3). In this state, the intermediate member 55 and the second member 54 are joined together by explosive welding (step S4). In the above manner, the joint segment 44 is fabricated, in which the first member 51, the intermediate member 55, and the second member 54 are sequentially stacked and integrated together. It should be noted that the grooves 51a, 54a, and 62 formed in the joint end 60 of the joint segment 44 may be formed, for example, through a cutting process that is performed after the components of the joint segment 44 are integrated together, or may be formed in the components of the joint segment 44 before these components are integrated together.

Next, the dissimilar material joint 50 is described in detail. The dissimilar material joint 50 shown in FIG. 2 is formed by arranging three joint segments 44A, 44B, and 44C consecutively in said order in the longitudinal direction. However, the number of joint segments 44 forming the dissimilar material joint 50 is not limited to three, but may be any real number that is two or more. In the dissimilar material joint 50, the joint ends 60 of the joint segments 44 that are adjacent to each other are butt-joined.

The dissimilar material joint 50 is fabricated in a manner described below. First, joint end faces of one joint segment 44 and another joint segment 44 that are to be joined together are caused to face each other, such that a root gap between the joint end faces is substantially zero, and then the first members 51 of the respective joint segments 44 are joined together by groove welding. Here, metal filling is fed into a groove (here, V-groove) formed between the lower surface groove 51a of the one joint segment 44 and the lower surface groove 51a of the other joint segment 44, and thus the groove is filled with a weld metal 58. The weld metal 58 is formed of the same material as that of the first member 51, or is formed of a material suitable for welding the first members 51 together.

Next, the second member 54 of the one joint segment 44 and the second member 54 of the other joint segment 44 are joined together by welding. Here, metal filling is fed into a groove (here, V-groove) formed between the upper surface groove 54a of the one joint segment 44 and the upper surface groove 54a of the other joint segment 44, and thus the groove is filled with a weld metal 57. The weld metal 57 is formed of the same material as that of the second member 54, or is formed of a material suitable for welding the second members 54 together. In the above manner, the joint ends 60 of the respective joint segments 44 are butt-joined. It should be noted that in a case where three or more joint segments 44 form the dissimilar material joint 50, the above butt-joining of joint segments 44 is repeated and the joint segments 44 are arranged sequentially and consecutively in the longitudinal direction. At last, excessive portions of the weld metals 57 and 58 at the joints are trimmed as necessary, and the overall shape is bent as necessary to have a predetermined curvature (here, the predetermined curvature corresponds to the curvature of the upper structural member 41 and the intermediate structural member 43). It should be noted that joint segments that are bent in advance to have the predetermined curvature may be joined together.

In the above process of fabricating the dissimilar material joint 50, the first members 51 of the joint segments 44 to be joined together are welded together, and also, the second members 54 of the joint segments 44 to be joined together are welded together. Thus, dissimilar metal materials are not welded together. Moreover, when the first members 51 or second members 54 of the joint segments 44 are welded together, the material of the first members 51 and the material of the second members 54 are not mixed together in a melted state owing to the grooves 62 which space apart the first members 51 and the second members 54 from each other. In other words, a portion that is cut into a groove shape (i.e., groove 62) is formed in the vicinity of the interface between the first member 51 and the second member 54 of each joint segment 44, such that the first member 51 and the second member 54 are spaced apart from each other in the stacking direction, and thereby dissimilar materials are prevented from being mixed together in a melted state when the first members 51 or second members 54 are welded together. In general, if an aluminum alloy and γ stainless steel are mixed together in a melted state, the material property (mechanical strength) at the joint degrades significantly. Meanwhile, in the case of the dissimilar material joint 50, there is no mixture of dissimilar materials in the butt-joined portion of the joint segments 44, and thus there is not a risk of mechanical strength degradation at the joint.

In the above process of fabricating the dissimilar material joint 50, the first members 51 of the joint segments 44 are joined together by welding, and also, the second members 54 of the joint segments 44 are joined together by welding. The amount of recess L1 of the end face 55a of the intermediate member 55 is set so that no detachment will occur at joint interfaces between components of the joint segments 44 due to welding heat input at the time of the welding. To be specific, the amount of recess L1 of the end face 55a of the intermediate member 55 is set so that the temperature of the joint interface between the intermediate member 55 and the second member 54 and the temperature of the joint interface between the intermediate member 55 and the first member 51, the joint interfaces being exposed at the side face 62s of the groove 62, will not become a predetermined temperature or higher due to the welding heat input. In the joint segment 44 according to the present embodiment, if the temperature of the joint interface between the intermediate member 55 and the first member 51 or the temperature of the joint interface between the intermediate member 55 and the second member 54, the joint interfaces being exposed at the side face 62s of the groove 62, becomes 300° C. or higher, then there is a risk of occurrence of detachment (crack) at the joint interface between the components of the joint segment 44. Therefore, the amount of recess L1 is set so that the temperature of the end face 55a of the intermediate member 55 will not become 300° C. or higher due to the welding heat input. Such an amount of recess L1 can be calculated by using, for example, the thermal conductivity of the first member 51, the thermal conductivity of the second member 54, and the amount of welding heat input. By suitably selecting the amount of recess L1, the influence of the welding heat input on the joint segment 44 at the joint interface between the first member 51 and the intermediate member 55 and the joint interface between the intermediate member 55 and the second member 54 can be further reduced.

Figure 6:
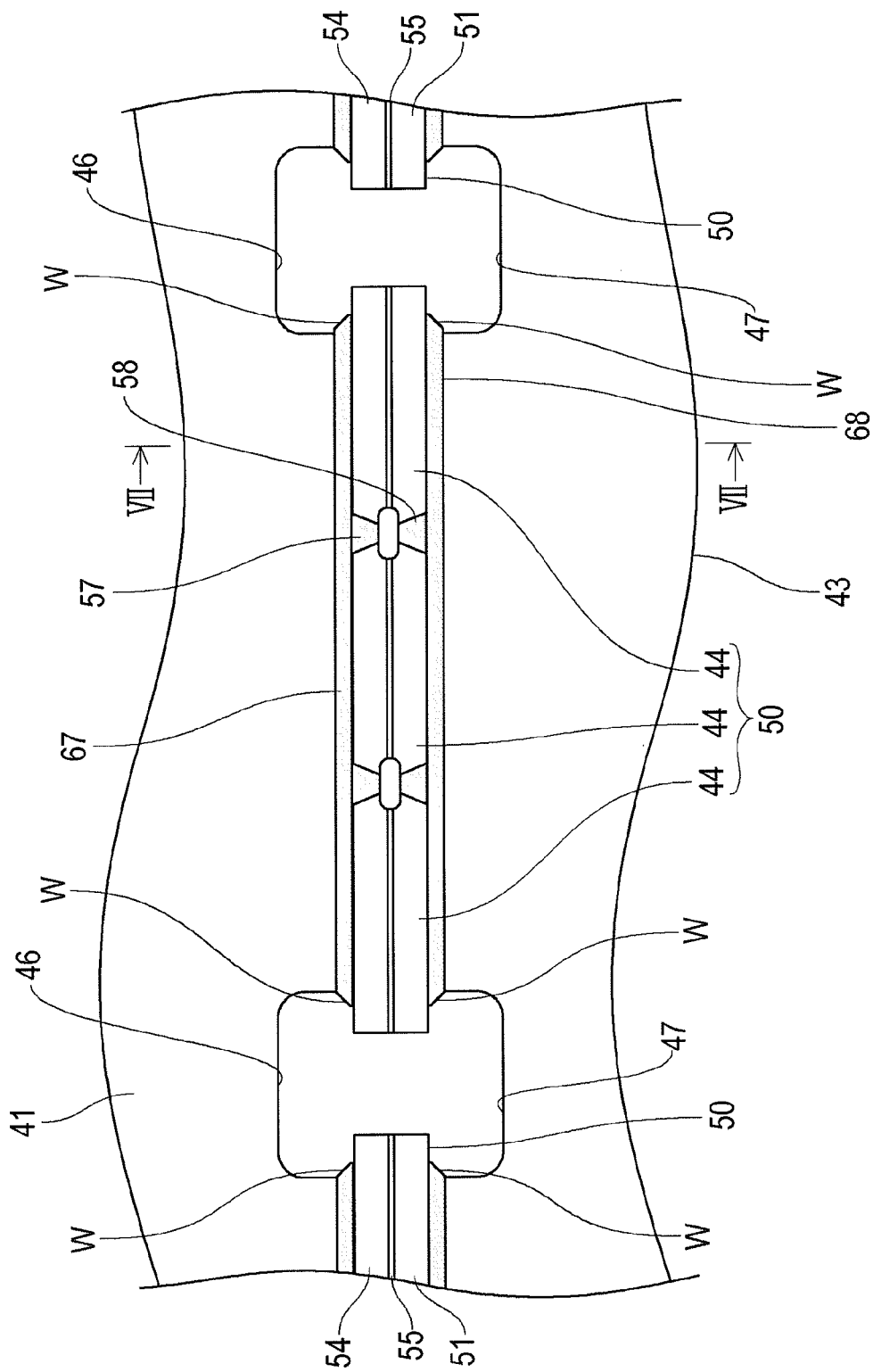
FIG. 6 partially shows a tank skirt's upper structural member and intermediate structural member connected via the dissimilar material joint.
Figure 7:
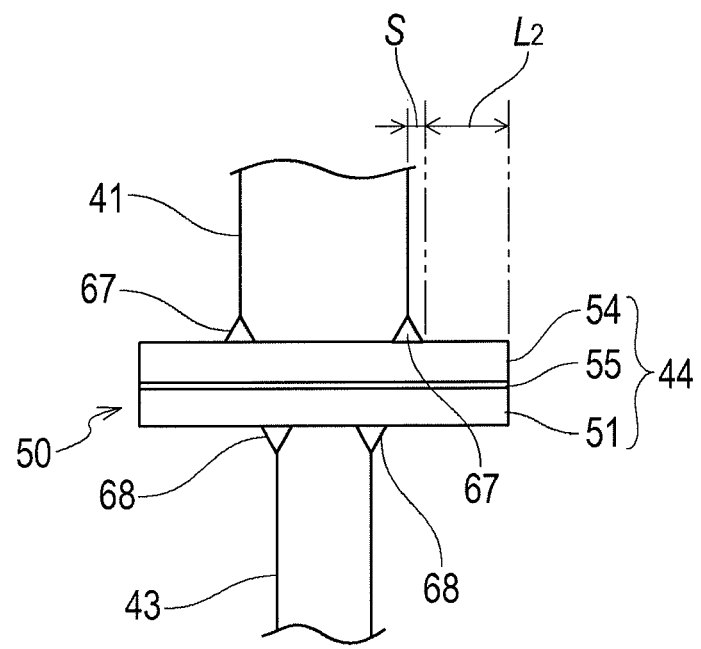
FIG. 7 is a sectional end view of FIG. 6, the view being taken along line VII-VII of FIG. 6, the view being seen in the direction of the arrows of line VII-VII.
Figure 8:
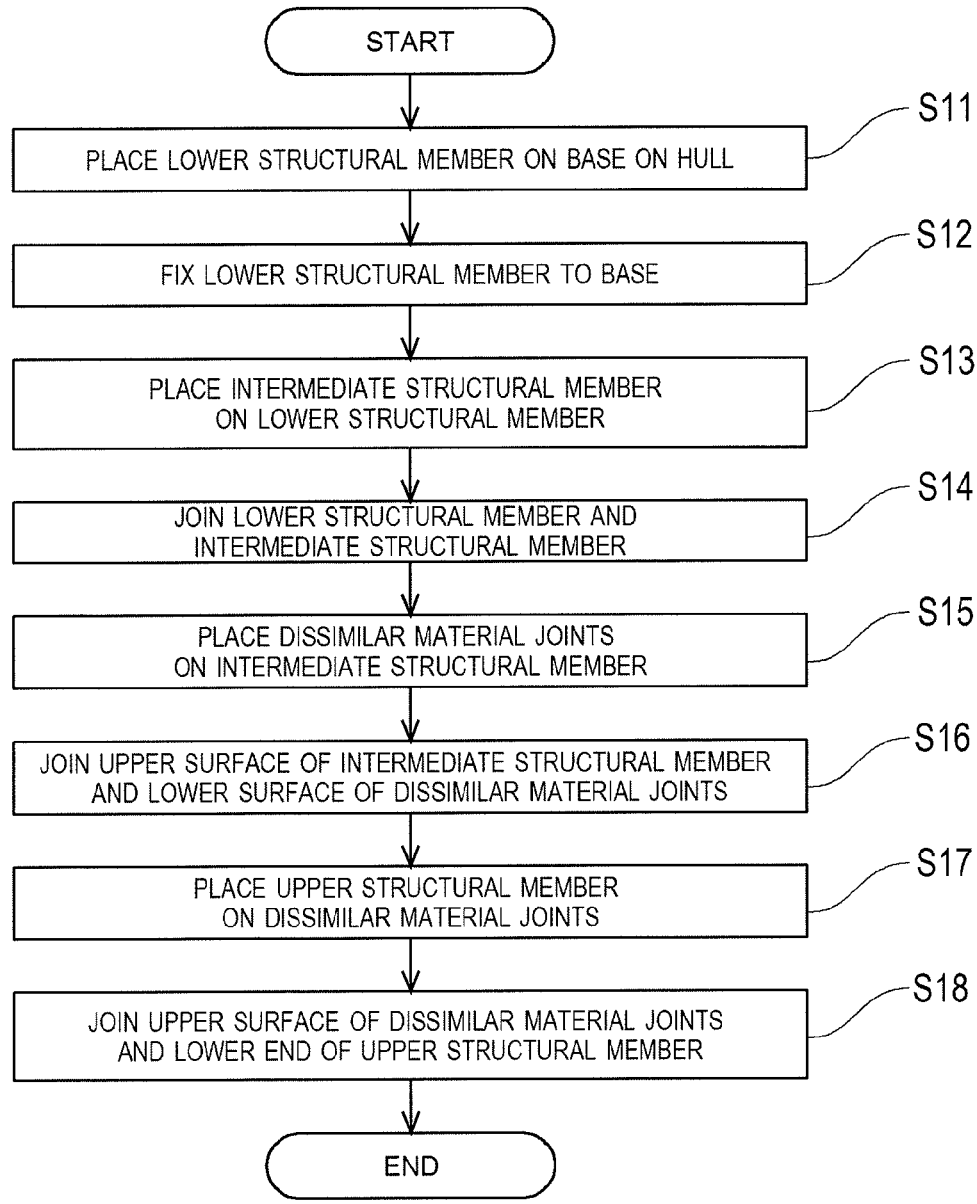
FIG. 8 is a flowchart illustrating a production flow of the tank skirt.

As described above, the dissimilar material joint 50 is formed of a plurality of joint segments 44. Accordingly, the dissimilar material joint 50 is longer than a single joint segment 44. The length of the joint segment 44 in the longitudinal direction is restricted to 2 to 3 m at longest due to an apparatus used for the explosive bonding. However, the length of the dissimilar material joint 50 in the longitudinal direction can be made longer than the restricted length of the joint segment 44. That is, the dissimilar material joint 50 can be made more elongated than dissimilar material joints used in conventional tank skirts. FIG. 6 partially shows the tank skirt's upper structural member and intermediate structural member connected via the dissimilar material joint. FIG. 7 is a sectional end view of FIG. 6, the view being taken along line VII-VII of FIG. 6, the view being seen in the direction of the arrows of line VII-VII. FIG. 8 is a flowchart illustrating a production flow of the tank skirt. Hereinafter, a method of producing the tank skirt 4, in which the dissimilar material joint 50 is used, is described with reference to FIGS. 6, 7, and 8.

First, the lower structural member 42 is placed on the base provided on the hull 2 (step S11), and the base and the lower structural member 42 are fixed to each other (step S12). The hull 2 and the lower structural member 42 may be fixed to each other by welding, or by fasteners such as bolts and nuts, or by rivets. Next, the intermediate structural member 43 is placed on the lower structural member 42 (step S13), and the upper end of the lower structural member 42 and the lower end of the intermediate structural member 43 are joined together by welding (step S14).

Next, a plurality of dissimilar material joints 50 are arranged on the intermediate structural member 43 in an annular manner (step S15). Here, as shown in FIG. 6, each dissimilar material joint 50 is positioned so as to connect slots 47 that are adjacent to each other in the circumferential direction of the intermediate structural member 43, and the ends of the dissimilar material joint 50 protrude into the slots 47. The lower surface of each dissimilar material joint 50 thus arranged (i.e., the surface at the first member 51 side) and the upper end of the intermediate structural member 43 are joined together by fillet welding (step S16). Here, as shown in FIG. 7, the upper end of the intermediate structural member 43 at the inner peripheral side and the upper end of the intermediate structural member 43 at the outer peripheral side are both fillet-welded to the lower surface of the dissimilar material joint 50. The reference sign 68 in FIG. 7 indicates a fillet that is formed by fillet-welding the intermediate structural member 43 and the dissimilar material joint 50.

Next, the upper structural member 41 is placed on the plurality of dissimilar material joints 50 arranged in an annular manner (step S17). Here, the upper structural member 41 is positioned such that the slots 46 of the upper structural member 41 and the slots 47 of the intermediate structural member 43 vertically face each other. At last, the lower end of the upper structural member 41 thus placed and the upper surface of each dissimilar material joint 50 (i.e., the surface at the second member 54 side) are joined together by fillet welding (step S18). Here, as shown in FIG. 7, the lower end of the upper structural member 41 at the inner peripheral side and the lower end of the upper structural member 41 at the outer peripheral side are both fillet-welded to the upper surface of the dissimilar material joint 50. The reference sign 67 in FIG. 7 indicates a fillet that is formed by fillet-welding the upper structural member 41 and the dissimilar material joint 50. It should be noted that, in the above-described method of producing the tank skirt 4, after the lower surface of each dissimilar material joint 50 and the upper end of the intermediate structural member 43 are joined together by fillet welding (step S16), the upper structural member 41 is placed on the plurality of dissimilar material joints 50 arranged in an annular manner (step S17). However, these steps may be performed in a reverse order. That is, first, the upper structural member 41 may be placed on the plurality of dissimilar material joints 50 arranged in an annular manner (step S17), and thereafter, the lower surface of each dissimilar material joint 50 and the upper end of the intermediate structural member 43 may be joined together by fillet welding (step S16) and the lower end of the upper structural member 41 and the upper surface of each dissimilar material joint 50 may be joined together by fillet welding (step S18).

In the tank skirt 4 produced through the above-described production process, as shown in FIG. 7, the lower end of the inner peripheral surface of the upper structural member 41 is distant radially (i.e., in a radial direction) from the inner peripheral end face of the dissimilar material joint 50 (joint segment 44) by, at least, the sum of a leg length S of the fillet 67 and a security length L2, and similarly, the lower end of the outer peripheral surface of the upper structural member 41 is distant radially (i.e., in a radial direction) from the outer peripheral end face of the dissimilar material joint 50 (joint segment 44) by, at least, the sum of the leg length S of the fillet 67 and the security length L2. The reason for this is to prevent a situation where cracks occur in the end faces due to detachment at the joint interfaces between the first member 51, the intermediate member 55, and the second member 54, the detachment being caused by welding heat input when the upper structural member 41 and the dissimilar material joint 50 are fillet-welded and the intermediate structural member 43 and the dissimilar material joint 50 are fillet-welded. The above "security length L2" is such a length as to allow the temperature of the inner peripheral end face or outer peripheral end face of the dissimilar material joint 50 to be a predetermined temperature (e.g., 300° C.) or lower when the upper structural member 41 and the dissimilar material joint 50 are welded together. The security length L2 can be calculated based on, for example, the amount of welding heat input, the thermal conductivity of the first member 51, and the thermal conductivity of the second member 54. It should be noted that the longitudinal end face of the dissimilar material joint 50 is also distant from the edge of the slot 46 of the upper structural member 41 by, at least, the sum of the leg length S of the fillet 67 and the security length L2. Similarly, the longitudinal end face of the dissimilar material joint 50 is distant from the edge of the slot 47 of the intermediate structural member 43 by, at least, the sum of the leg length S of the fillet 68 and the security length L2.

The number of slots 46 and 47 of the above-described tank skirt 4 can be reduced compared to a conventional tank skirt having the same diameter as the diameter of the tank skirt 4 since the tank skirt 4 is produced by using dissimilar material joints 50, which are more elongated than the conventional art. The number of slots 46 and 47 being reduced means that the amount of machining for forming the slots 46 and 47 in the upper structural member 41 and the intermediate structural member 43 is reduced, and also, the number of portions where the dissimilar material joint 50 and the edges of the slots 46 and 47 are box-welded is reduced. At the portions where the dissimilar material joint 50 and the edges of the narrow slots 46 and 47 are box-welded, the welding work is manually performed by an operator. However, except the edges of the slots 46 and 47, the upper structural member 41 and the intermediate structural member 43 can be welded to the dissimilar material joint 50 along the inner and outer peripheries of the structural members 41 and 43 by automated welding. Accordingly, since the number of slots 46 and 47 is reduced, the number of portions that can be welded by automated welding in the production process of the tank skirt 4 is increased. This consequently reduces the number of portions where defective welding may occur, thereby contributing to quality stabilization. Moreover, since the more elongated dissimilar material joint 50 is used in the tank skirt 4, the area of joints exposed to the external air is reduced, which makes it possible to reduce the cost of end face treatment at the joints.

One desirable embodiment of the dissimilar material joint 50, the joint segments 44 forming the dissimilar material joint 50, and the tank skirt 4 produced by using the dissimilar material joint 50 has been described as above. It should be noted that the dissimilar material joint 50 is not limited to the above-described embodiment. Variations as exemplified in Variations 1 to 4 described below may be made.

[Variation 1]

Figure 9:
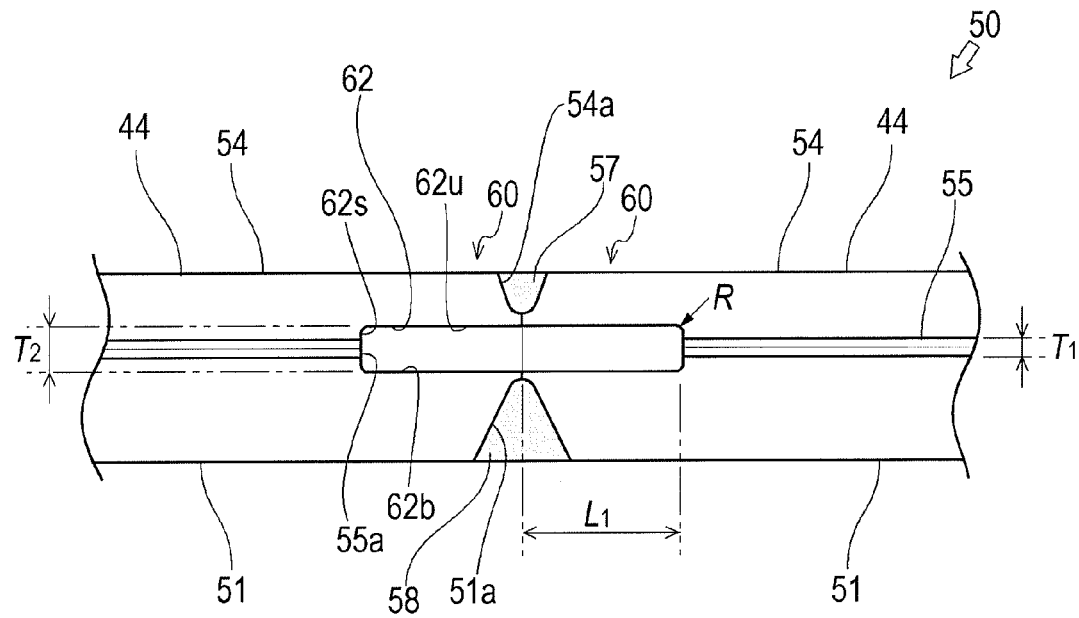
FIG. 9 shows Variation 1 of the joint segments and the dissimilar material joint.

FIG. 9 shows Variation 1 of the joint segments and the dissimilar material joint. As shown in FIG. 9, the structure and production method of the joint segments 44 and the dissimilar material joint 50 according to Variation 1 are the same as those of the joint segments 44 and the dissimilar material joint 50 according to the above-described embodiment except for the shape of the joint ends 60 of the joint segments 44. Hereinafter, the shape of the joint ends 60 of the joint segments 44 according to Variation 1 is described in detail, and other redundant description is omitted.

At the joint ends 60 of the joint segments 44, the lower surface grooves 51a are formed in the lower surfaces of the first members 51. The lower surface grooves 51a form a U-groove, and the depth of the groove is less than the thickness of the first member 51. Also at the joint ends 60, the upper surface grooves 54a are formed in the upper surfaces of the second members 54. The upper surface grooves 54a form a U-groove, and the depth of the groove is less than the thickness of the second member 54. Moreover, the groove 62, which is open toward the outside, is formed in the joint end face of each joint segment 44. The groove 62 forms space that separates the end face of the first member 51 and the end face of the second member 54 from each other in the stacking direction along the joint end face.

The groove 62 is a recess having a substantially C-shaped (or substantially inverted C-shaped) cross section, and extends along the joint end face of the joint segment 44. The upper face 62u of the groove 62 is formed by the second member 54; the lower face 62b of the groove 62 is formed by the first member 51; the side face 62s of the groove 62 is formed by the first member 51, the intermediate member 55, and the second member 54; and the edge line between the upper face 62u and the side face 62s of the groove 62, and the edge line between the lower face 62b and the side face 62s of the groove 62, each have a rounded shape with a curvature radius R. If the thickness of the intermediate member 55 is T1, a distance T2 between the upper face 62u and the lower face 62b of the groove 62 is represented by T2=T1+R.

The amount of recess L1 of the end face 55a of the intermediate member 55 from the joint end face of the joint segment 44 may be the same as the amount of recess L1 according to the above-described embodiment. That is, the amount of recess L1 is set so that, in the process of fabricating the dissimilar material joint 50, the temperature of the joint interface between the intermediate member 55 and the second member 54 and the temperature of the joint interface between the intermediate member 55 and the first member 51, the joint interfaces being exposed at the side face 62s of the groove 62, will not become a predetermined temperature or higher due to welding heat input at the time of welding the first members 51 of the joint segments 44 together and welding the second members 54 of the joint segments 44 together, the predetermined temperature causing a risk of detachment at these joint interfaces.

The joint segments 44 and the dissimilar material joint 50 according to Variation 1 are different from the joint segments 44 and the dissimilar material joint 50 according to the above-described embodiment mainly in terms of the shape of the grooves 51a and 54a. Thus, the shape of the grooves 51a and 54a formed in the joint end 60 of each joint segment 44 is not limited to the above-described embodiment, but may be changed freely.

[Variation 2]

Figure 10:
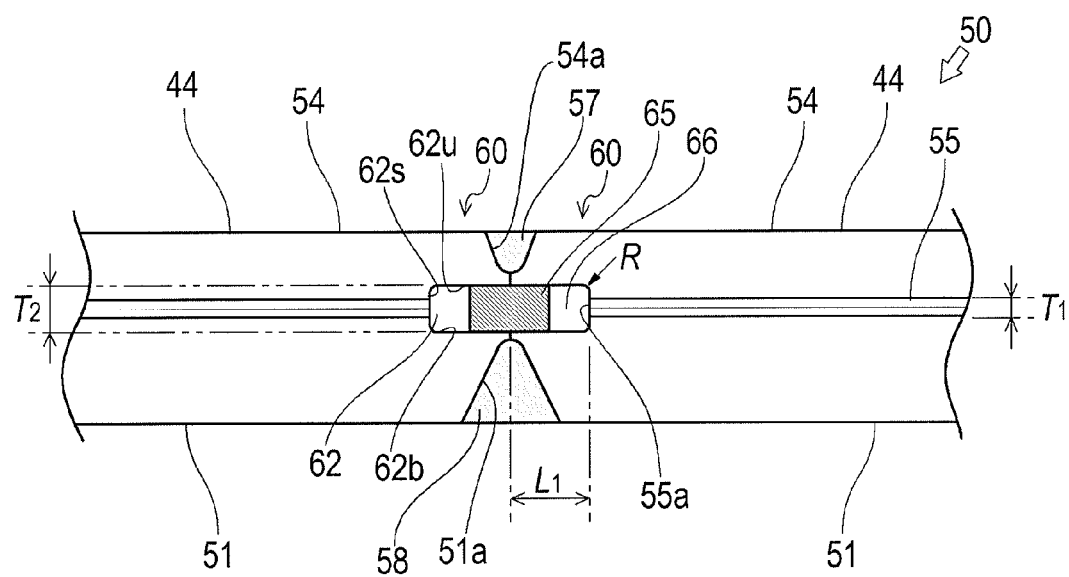
FIG. 10 shows Variation 2 of the joint segments and the dissimilar material joint.

FIG. 10 shows Variation 2 of the joint segments and the dissimilar material joint. As shown in FIG. 10, the structure and production method of the joint segments 44 and the dissimilar material joint 50 according to Variation 2 are the same as those of the joint segments 44 and the dissimilar material joint 50 according to the above-described embodiment except that, in Variation 2, the shape of the joint ends 60 of the joint segments 44 is different and a backing member 65 is provided at a joined portion between the joint segments 44 that are adjacent to each other in the dissimilar material joint 50. Hereinafter, the shape of the joint ends 60 of the joint segments 44 and the backing member 65 according to Variation 2 are described in detail, and other redundant description is omitted.

At the joint ends 60 of the joint segments 44, the lower surface grooves 51a are formed in the lower surfaces of the first members 51. The lower surface grooves 51a form a U-groove, and the depth of the groove is less than the thickness of the first member 51. Also at the joint ends 60, the upper surface grooves 54a are formed in the upper surfaces of the second members 54. The upper surface grooves 54a form a U-groove, and the depth of the groove is less than the thickness of the second member 54. Moreover, the groove 62, which is open toward the outside, is formed in the joint end face of each joint segment 44. The groove 62 forms space that separates the first member 51 and the second member 54 from each other.

The groove 62 is a recess having a substantially C-shaped (or substantially inverted C-shaped) cross section, and extends along the joint end face of the joint segment 44. The upper face 62u of the groove 62 is formed by the second member 54; the lower face 62b of the groove 62 is formed by the first member 51; the side face 62s of the groove 62 is formed by the first member 51, the intermediate member 55, and the second member 54; and the edge line between the upper face 62u and the side face 62s of the groove 62, and the edge line between the lower face 62b and the side face 62s of the groove 62, each have a rounded shape with a curvature radius R. If the thickness of the intermediate member 55 is T1, the distance T2 between the upper face 62u and the lower face 62b of the groove 62 is represented by $T2=T1+R$.

The backing member 65 is inserted in space 66 formed between the joint segments 44 that are adjacent to each other in the dissimilar material joint 50. The space 66 is formed as a result of the grooves 62 being connected to each other. A part of the backing member 65 is positioned within the groove 62 of one joint segment 44, and the remaining part of the backing member 65 is positioned within the groove 62 of the other joint segment 44. That is, the backing member 65 spans between the joint segments 44 which are joined together. The height of the backing member 65 is substantially the same as the height of the space 66, and the backing member 65 is in contact with the upper face 62u and the lower face 62b of each groove 62. In this manner, the backing member 65 partially fills up vertical space in the space 66, thereby improving the mechanical strength of the dissimilar material joint 50 against compression.

The side faces of the backing member 65 are spaced apart from the side faces 62s of the respective grooves 62, and the backing member 65 is formed of a material whose thermal conductivity is higher than the thermal conductivity of the first member 51 and the thermal conductivity of the second member 54. For example, in a case where the first member 51 is formed of a stainless steel and the second member 54 is formed of an aluminum alloy, the backing member 65 may be formed of copper. At the time of welding the first members 51 of the joint segments 44 together and welding the second members 54 of the joint segments 44 together in the process of fabricating the dissimilar material joint 50, such choice of the material of the backing member 65 is expected to facilitate the transfer of the welding heat input to the backing member 65, thereby suppressing heat diffusion within the first members 51 and second members 54. Accordingly, the distance from the opening of the groove 62 to the side face 62s, that is, the amount of recess L1 of the end face 55a of the intermediate member 55 from the joint end face of the joint segment 44, may be less than the amount of recess L1 of the joint segment 44 of the above-described embodiment. Such a smaller recess will suffice.

The joint segments 44 and the dissimilar material joint 50 according to Variation 2 are different from the joint segments 44 and the dissimilar material joint 50 according to the above-described embodiment in that, in Variation 2, the amount of recess L1 of the end face 55a of the intermediate member 55 is reduced and the backing member 65 is additionally provided, and thereby the mechanical strength of the dissimilar material joint 50 against compression is improved.

[Variation 3]

Figure 11:
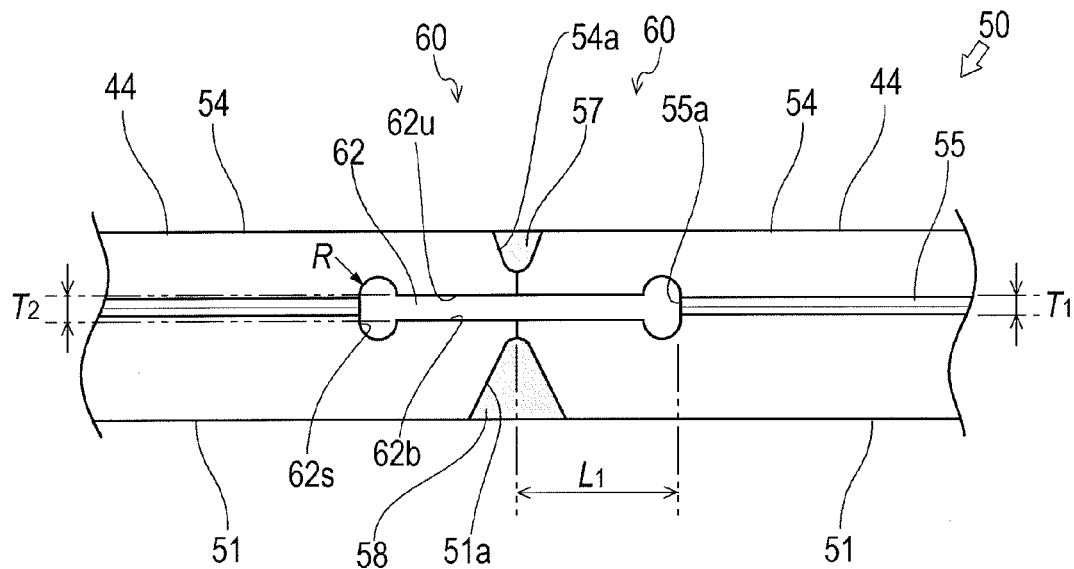
FIG. 11 shows Variation 3 of the joint segments and the dissimilar material joint.

FIG. 11 shows Variation 3 of the joint segments and the dissimilar material joint. As shown in FIG. 11, the structure and production method of the joint segments 44 and the dissimilar material joint 50 according to Variation 3 are the same as those of the joint segments 44 and the dissimilar material joint 50 according to the above-described embodiment except for the shape of the joint ends 60 of the joint segments 44. Hereinafter, the shape of the joint ends 60 of the joint segments 44 according to Variation 3 is described in detail, and other redundant description is omitted.

At the joint ends 60 of the joint segments 44, the lower surface grooves 51a are formed in the lower surfaces of the first members 51. The lower surface grooves 51a form a U-groove, and the depth of the groove is less than the thickness of the first member 51. Also at the joint ends 60, the upper surface grooves 54a are formed in the upper surfaces of the second members 54. The upper surface grooves 54a form a U-groove, and the depth of the groove is less than the thickness of the second member 54. Moreover, the groove 62, which is open toward the outside, is formed in the joint end face of each joint segment 44. The groove 62 forms space that separates the first member 51 and the second member 54 from each other.

The groove 62 has a substantially C-shaped (or substantially inverted C-shaped) cross section, and extends along the joint end face of the joint segment 44. The upper face 62u of the groove 62 is formed by the second member 54; the lower face 62b of the groove 62 is formed by the first member 51; the side face 62s of the groove 62 is formed by the first member 51, the intermediate member 55, and the second member 54; and the edge line between the upper face 62u and the side face 62s of the groove 62, and the edge line between the lower face 62b and the side face 62s of the groove 62, each have a rounded shape with a curvature radius R. If the thickness of the intermediate member 55 is T1, the distance T2 between the upper face 62u and the lower face 62b of the groove 62 is represented by $T2=T1+a$. The value a is significantly small, and T2 is slightly greater than T1. Since R is greater than a, the distance between the upper face 62u and the lower face 62b is partially expanded near the edge line formed by the upper face 62u and the side face 62s of the groove 62 and near the edge line formed by the side face 62s and the lower face 62b of the groove 62.

The distance from the opening of the groove 62 to the side face 62s, that is, the amount of recess L1 of the end face 55a of the intermediate member 55 from the joint end face of the joint segment 44, may be the same as the amount of recess L1 according to the above-described embodiment. That is, the amount of recess L1 is set so that, in the process of fabricating the dissimilar material joint 50, the temperature of the joint interface between the intermediate member 55 and the second member 54 and the temperature of the joint interface between the intermediate member 55 and the first member 51, the joint interfaces being exposed at the side face 62s, will not become a predetermined temperature or higher due to welding heat input at the time of welding the first members 51 of the joint segments 44 together and welding the second members 54 of the joint segments 44 together, the predetermined temperature causing a risk of detachment at these joint interfaces.

The joint segments 44 and the dissimilar material joint 50 according to Variation 3 are different from the joint segments 44 and the dissimilar material joint 50 according to the above-described embodiment in that, in Variation 3, the distance T2 between the upper face 62u and the lower face 62b of the groove 62 is reduced, and thereby reduction in the rigidity of the dissimilar material joint 50 and reduction in the mechanical strength of the dissimilar material joint 50 against compression are suppressed.

[Variation 4]

Figure 12:
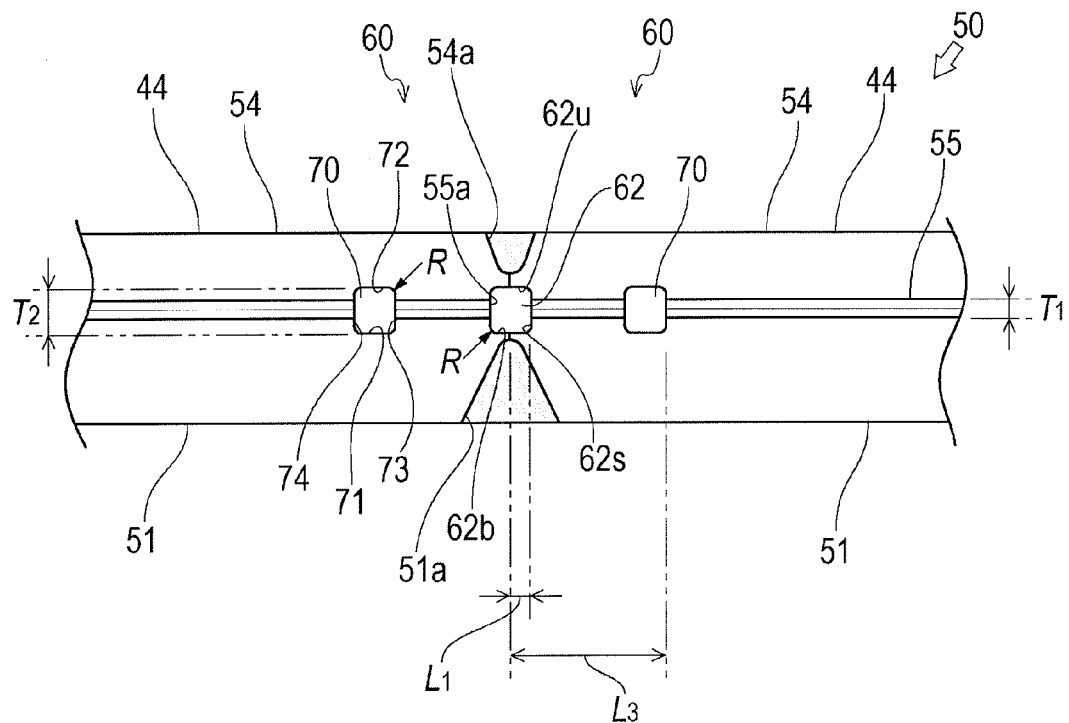
FIG. 12 shows Variation 4 of the joint segments and the dissimilar material joint.
Figure 13:
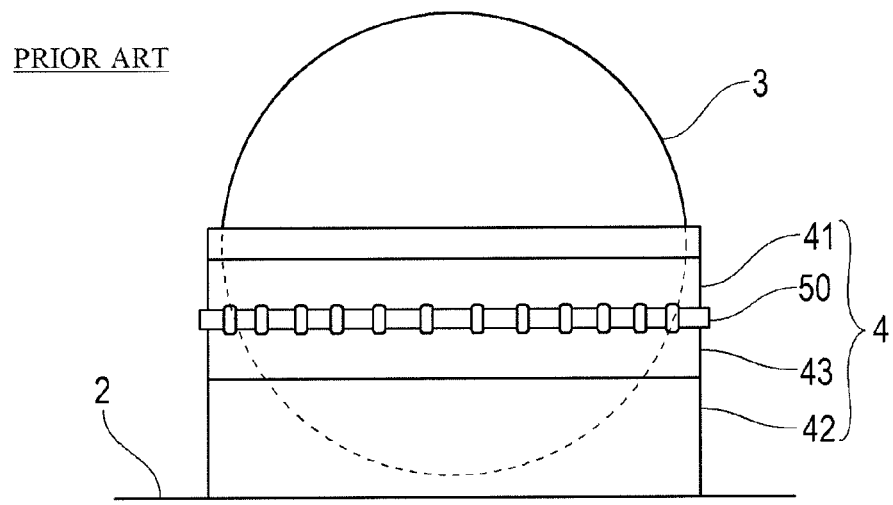
FIG. 13 is a schematic side view showing a support structure for a tank of a conventional LNG carrier.
Figure 14:
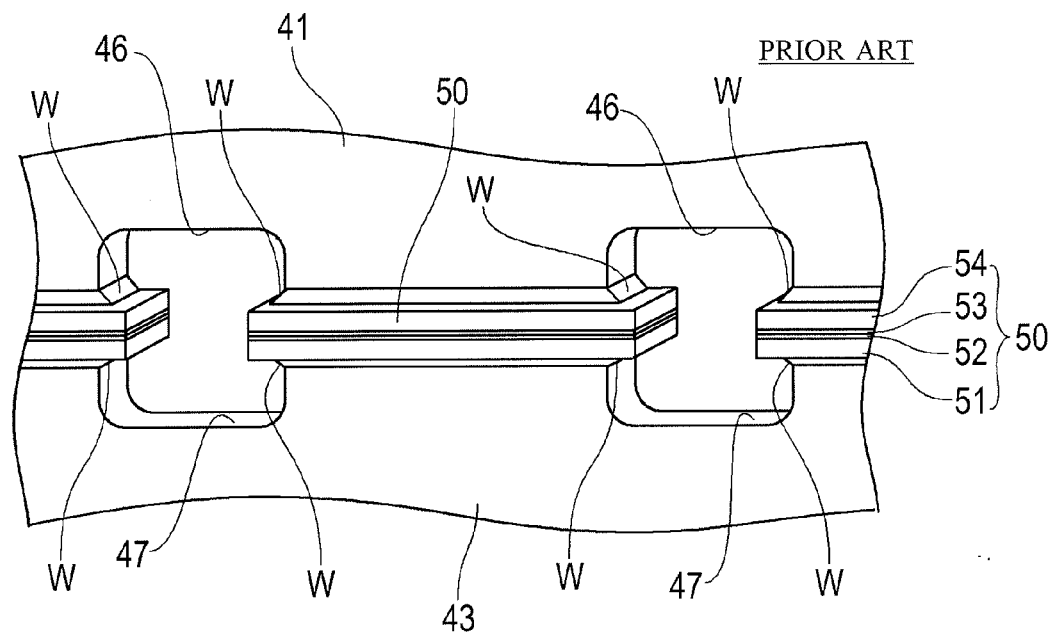
FIG. 14 is a perspective view showing slots and their surroundings in a conventional tank skirt.

FIG. 12 shows Variation 4 of the joint segments and the dissimilar material joint. As shown in FIG. 12, the structure and production method of the joint segments 44 and the dissimilar material joint 50 according to Variation 4 are the same as those of the joint segments 44 and the dissimilar material joint 50 according to the above-described embodiment except for the shape of the joint ends 60 of the joint segments 44. Hereinafter, the shape of the joint ends 60 of the joint segments 44 according to Variation 4 is described in detail, and other redundant description is omitted.

At the joint ends 60 of the joint segments 44, the lower surface grooves 51a are formed in the lower surfaces of the first members 51. The lower surface grooves 51a form a U-groove, and the depth of the groove is less than the thickness of the first member 51. Also at the joint ends 60, the upper surface grooves 54a are formed in the upper surfaces of the second members 54. The upper surface grooves 54a form a U-groove, and the depth of the groove is less than the thickness of the second member 54. Moreover, the groove 62, which is open toward the outside, is formed in the joint end face of each joint segment 44. The groove 62 forms space that separates the end face of the first member 51 and the end face of the second member 54 from each other in the stacking direction along the joint end face.

The groove 62 has a substantially C-shaped (or substantially inverted C-shaped) cross section, and extends along the joint end face of the joint segment 44. The upper face 62u of the groove 62 is formed by the second member 54; the lower face 62b of the groove 62 is formed by the first member 51; the side face 62s of the groove 62 is formed by the first member 51, the intermediate member 55, and the second member 54; and the edge line between the upper face 62u and the side face 62s of the groove 62, and the edge line between the lower face 62b and the side face 62s of the groove 62, each have a rounded shape with a curvature radius R. If the thickness of the intermediate member 55 is T1, the distance T2 between the upper face 62u and the lower face 62b of the groove 62 is represented by T2=T1+R. The distance from the opening of the groove 62 to the side face 62s, that is, the amount of recess L1 of the end face 55a of the intermediate member 55 from the joint end face of the joint segment 44, is less than the amount of recess L1 according to the above-described embodiment.

Hollow space 70 is formed within each joint segment 44 such that the hollow space 70 is away from the joint end face. The hollow space 70 extends through the joint segment 44 in a manner substantially parallel to the joint end face of the joint segment 44. The hollow space 70 is formed substantially parallel to the groove 62. A lower face 71 of the hollow space 70 is formed by the first member 51; an upper face 72 of the hollow space 70 is formed by the second member 54; and both side faces 73 and 74 of the hollow space 70 are formed by the first member 51, the intermediate member 55, and the second member 54. Edge lines formed by the upper face 72 and the side faces 73 and 74 of the hollow space 70, and edge lines formed by the lower face 71 and the side faces 73 and 74 of the hollow space 70, each have a rounded shape with a curvature radius R. At the side faces 73 and 74 of the hollow space 70, the intermediate member 55 is exposed as a flat face substantially parallel to the joint end face.

The distance between the upper face 72 and the lower face 71 of the hollow space 70 is equal to the distance T2 between the upper face 62u and the lower face 62b of the groove 62. If the thickness of the intermediate member 55 is T1, then T2=T1+R. Of the side faces 73 and 74 of the hollow space 70, the side face 74, which is more distant from the joint end face of the joint segment 44, has a distance L3 from the joint end face. The distance L3 is set so that, in the process of fabricating the dissimilar material joint 50, the temperature of the joint interface between the intermediate member 55 and the second member 54 and the temperature of the joint interface between the intermediate member 55 and the first member 51, the joint interfaces being exposed at the side face 74 of the hollow space 70, will not become a predetermined temperature or higher due to welding heat input at the time of welding the first members 51 of the joint segments 44 together and welding the second members 54 of the joint segments 44 together, the predetermined temperature causing a risk of detachment at these joint interfaces. The distance L3 according to Variation 4 may be the same as the amount of recess L1 according to the above-described embodiment.

In each joint segment 44 according to Variation 4, the groove 62 for allowing the first member 51 and the second member 54 to be spaced apart from each other is formed so that dissimilar materials will not become mixed together in a melted state when the joint segments 44 that are adjacent to each other are joined together by welding. Further, in each joint segment 44 according to Variation 4, the hollow space 70 is formed so that detachment (crack) at a joint interface between components of the joint segment 44 due to welding heat input can be prevented from propagating. Between the groove 62 and the hollow space 70, even if detachment (crack) has occurred at a joint interface between components of the joint segment 44, the detachment is stopped at the hollow space 70, and the detachment does not further propagate toward the inside beyond the hollow space 70.

The joint segments 44 and the dissimilar material joint 50 according to Variation 4 are different from the joint segments 44 and the dissimilar material joint 50 according to the above-described embodiment in that, in Variation 4, the amount of recess L1 of the end face 55a of the intermediate member 55 is reduced, and thereby reduction in the rigidity of the dissimilar material joint 50 and reduction in the mechanical strength of the dissimilar material joint 50 against compression are suppressed.

INDUSTRIAL APPLICABILITY

According to the present invention, a dissimilar material joint formed by joining dissimilar materials together by explosive welding can be made elongated. The dissimilar material joint thus formed is particularly useful as a dissimilar material joint for use in constructing a large structure.

REFERENCE SIGNS LIST 2 hull
3 tank
4 tank skirt
41 upper structural member
42 lower structural member
43 intermediate structural member
44 joint segment
46, 47 slot 50 dissimilar material joint
51 first member
51a lower surface groove
52 nickel member
53 titanium member
54 second member
54a upper surface groove
55 intermediate member
60 joint end
61 non-joint end
62 groove
65 backing member
70 hollow space

The invention claimed is:

1. A dissimilar material joint including a plurality of segments arranged consecutively in a longitudinal direction, each segment comprising:
   a first member;
   an intermediate member formed of a material different from a material of the first member, the intermediate member being joined to the first member in a stacking direction by explosive welding;
   a second member formed of a material different from the material of the first member and different from the material of the intermediate member, the second member being joined to the intermediate member in the stacking direction by explosive welding; and
   a recess formed in a joint end face joined to another one of the segments, the recess spacing apart an end face of the first member and an end face of the second member from each other in the stacking direction along the joint end face, wherein
   the end faces of the respective first members of the segments that are adjacent to each other are joined together by welding,
   the end faces of the respective second members of the segments that are adjacent to each other are joined together by welding, and
   each of the segments includes hollow space formed at a position that is set back from the joint interface further than the recess in the longitudinal direction, the hollow space spacing apart the first member and the second member from each other in the stacking direction.

2. The dissimilar material joint according to claim 1, wherein the recess is formed such that an end face of the intermediate member is recessed in the longitudinal direction from the joint end face.

3. The dissimilar material joint according to claim 2, wherein an amount by which the end face of the intermediate member is recessed from the joint end face is such an amount as to allow a temperature of a joint interface between the first member and the intermediate member and a temperature of a joint interface between the intermediate member and the second member to become a predetermined temperature or lower, the predetermined temperature causing a risk of occurrence of detachment at the joint interfaces, when welding heat input of the welding of the end faces of the first members and welding heat input of the welding of the end faces of the second members are applied to the joint interfaces.

4. The dissimilar material joint according to claim 1, wherein
   the recesses of the respective segments that are adjacent to each other are arranged continuously to form space, and
   a backing member having such a shape as to be in contact with the first and second members of both of the segments that are adjacent to each other is provided in the space.

5. The dissimilar material joint according to claim 1, wherein
   the recess has a first face formed by the first member, a second face formed by the second member, and a third face formed by the first member, the intermediate member, and the second member,
   a corner at an edge line where the first face and the third face are connected, and a corner at an edge line where the second face and the third face are connected, are rounded, and
   the third face is a flat face substantially parallel to the joint end face.

6. A structure in which a dissimilar material joint is used, the structure comprising:
   the dissimilar material joint according to claim 1;
   a first structural member joined to the first member of the dissimilar material joint by welding; and
   a second structural member joined to the second member of the dissimilar material joint by welding.

7. The structure in which a dissimilar material joint is used, according to claim 6, wherein
   both of the first member and the first structural member are formed of an aluminum alloy, and
   both of the second member and the second structural member are formed of a stainless steel.

8. The structure in which a dissimilar material joint is used, according to claim 6, wherein the structure is a tank skirt of a spherical tank of an LNG carrier.

9. A dissimilar material including a plurality of segments arranged consecutively in a longitudinal direction, each segment comprising:
   a first member;
   an intermediate member formed of a material different from a material of the first member, the intermediate member being joined to the first member in a stacking direction by explosive welding;
   a second member formed of a material different from the material of the first member and different from the material of the intermediate member, the second member being joined to the intermediate member in the stacking direction by explosive welding; and
   a recess formed in a joint end face joined to another one of the segments, the recess spacing apart an end face of the first member and an end face of the second member from each other in the stacking direction along the joint end face, wherein
   the end faces of the respective first members of the segments that are adjacent to each other are joined together by welding,
   the end faces of the respective second members of the segments that are adjacent to each other are joined together by welding,
   the recesses of the respective segments that are adjacent to each other are arranged continuously to form space, and
   a backing member provided in the space, the backing member is formed of a material whose thermal conductivity is higher than a thermal conductivity of the first member and a thermal conductivity of the second member, and the backing member has such a shape as not to come into contact with the intermediate members of both of the segments that are adjacent to each other and to be in contact with the first and second members of both of the segments that are adjacent to each other.

10. A structure in which a dissimilar material joint is used, the structure comprising:
   the dissimilar material joint according to claim 9;
   a first structural member joined to the first member of the dissimilar material joint by welding; and
   a second structural member joined to the second member of the dissimilar material joint by welding.

11. The structure in which a dissimilar material joint is used, according to claim 10, wherein:
   both of the first member and the first structural member are formed of an aluminum alloy, and
   both of the second member and the second structural member are formed of a stainless steel.

12. The structure in which a dissimilar material joint is used, according to claim 10, wherein the structure is a tank skirt of a spherical tank of an LNG carrier.

13. A method of producing a structure in which a dissimilar material joint is used, the method comprising:
   fabricating a plurality of segments;
   fabricating a dissimilar material joint by consecutively arranging the plurality of segments in a longitudinal direction;
   joining one side of the dissimilar material joint and a first structural member together by welding; and
   joining another side of the dissimilar material joint and a second structural member together by welding, wherein
   fabricating the plurality of segments includes:
      joining a first member and an intermediate member together in a stacking direction by explosive welding, the first member being formed of a same material as a material of the first structural member;
      joining the intermediate member and a second member together in the stacking direction by explosive welding, the second member being formed of a same material as a material of the second structural member; and
      forming a recess in a joint end face of each segment, the joint end face being joined to another one of the segments, the recess spacing apart an end face of the first member and an end face of the second member from each other in the stacking direction along the joint end face, and
   fabricating the dissimilar material joint includes:
      joining together the end faces of the respective first members of the segments that are adjacent to each other by welding; and
      joining together the end faces of the respective second members of the segments that are adjacent to each other by welding, wherein each of the segments includes hollow space formed at a position that is set back from the joint interface further than the recess in the longitudinal direction, the hollow space spacing apart the first member and the second member from each other in the stacking direction.

14. A method of producing a structure in which a dissimilar material joint is used, the method comprising:
   fabricating a plurality of segments;
   fabricating a dissimilar material joint by consecutively arranging the plurality of segments in a longitudinal direction;
   joining one side of the dissimilar material joint and a first structural member together by welding; and
   joining another side of the dissimilar material joint and a second structural member together by welding, wherein
   fabricating the plurality of segments includes:
      joining a first member and an intermediate member together in a stacking direction by explosive welding, the first member being formed of a same material as a material of the first structural member;
      joining the intermediate member and a second member together in the stacking direction by explosive welding, the second member being formed of a same material as a material of the second structural member; and
      forming a recess in a joint end face of each segment, the joint end face being joined to another one of the segments, the recess spacing apart an end face of the first member and an end face of the second member from each other in the stacking direction along the joint end face, and fabricating the dissimilar material joint includes:
   joining together the end faces of the respective first members of the segments that are adjacent to each other by welding; and
   joining together the end faces of the respective second members of the segments that are adjacent to each other by welding; and
   providing a backing member in a space formed by arranging the recesses of the respective segments that are adjacent to each other continuously, wherein the backing member is formed of a material whose thermal conductivity is higher than a thermal conductivity of the first member and a thermal conductivity of the second member, and the backing member has such a shape as not to come into contact with the intermediate members of both of the segments that are adjacent to each other and to be in contact with the first and second members of both of the segments that are adjacent to each other.

* * * * *